US009104531B1

(12) United States Patent
Shumsky

(10) Patent No.: US 9,104,531 B1
(45) Date of Patent: Aug. 11, 2015

(54) MULTI-CORE DEVICE WITH MULTI-BANK MEMORY

(71) Applicant: Marvell Israel (M.I.S.L.) Ltd., Yokneam (IL)

(72) Inventor: Evgeny Shumsky, Petah Tikva (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 206 days.

(21) Appl. No.: 13/674,810

(22) Filed: Nov. 12, 2012

Related U.S. Application Data

(60) Provisional application No. 61/559,463, filed on Nov. 14, 2011, provisional application No. 61/592,847, filed on Jan. 31, 2012.

(51) Int. Cl.

| | |
|---|---|
| ***G06F 12/00*** | (2006.01) |
| ***G06F 13/16*** | (2006.01) |
| ***G06F 13/372*** | (2006.01) |
| ***G06F 13/362*** | (2006.01) |
| ***G06F 12/08*** | (2006.01) |
| ***G06F 12/02*** | (2006.01) |
| ***G06F 13/14*** | (2006.01) |

(52) U.S. Cl.
CPC ............ *G06F 12/00* (2013.01); *G06F 12/0284* (2013.01); *G06F 12/0844* (2013.01); *G06F 13/14* (2013.01); *G06F 13/161* (2013.01); *G06F 13/1621* (2013.01); *G06F 13/1626* (2013.01); *G06F 13/1642* (2013.01); *G06F 13/1652* (2013.01); *G06F 13/1657* (2013.01); *G06F 13/1663* (2013.01); *G06F 13/1673* (2013.01); *G06F 13/3625* (2013.01); *G06F 13/372* (2013.01)

(58) Field of Classification Search
CPC . G06F 12/00; G06F 12/0284; G06F 12/0844; G06F 13/14; G06F 13/161; G06F 13/1621; G06F 13/1626; G06F 13/1642; G06F 13/1652; G06F 13/1657; G06F 13/1663; G06F 13/1673; G06F 13/3625; G06F 13/372
See application file for complete search history.

(56) References Cited

U.S. PATENT DOCUMENTS

| | | | | |
|---|---|---|---|---|
| 5,920,898 | A * | 7/1999 | Bolyn et al. | 711/167 |
| 6,088,771 | A * | 7/2000 | Steely et al. | 711/154 |
| 2002/0174252 | A1 * | 11/2002 | Hayter et al. | 709/250 |

* cited by examiner

*Primary Examiner* — Shawn X Gu

(57) ABSTRACT

Some of the embodiments of the present disclosure provide a multi-core switch device comprising a plurality of P processing cores for processing packets received from a computer network; a memory comprising a plurality of M memory banks, the plurality of processing cores and the plurality of memory banks being arranged such that the plurality of processing cores have access to multiple memory banks among the plurality of memory banks to perform corresponding memory operations; and a memory access controller coupling the plurality of processing cores to the plurality of memory banks, the memory access controller configured to selectively provide, to each of the plurality of processing cores, access to multiple memory banks among the plurality of memory banks over a number of N physical couplings such that N (i) is an integer and (ii) is less than P times M.

22 Claims, 5 Drawing Sheets

Table 400

| Clock cycles / Memory banks | 0 | 1 | 2 | 3 | 4 | 5 | 6 | 7 | 8 | 9 |
|---|---|---|---|---|---|---|---|---|---|---|
| Memory bank 0 | w0 | r0 | w1 | r1 | w2 | r2 | w3 | r3 | w4 | r4 |
| Memory bank 1 | r4 | w0 | r0 | w1 | r1 | w2 | r2 | w3 | r3 | w4 |
| Memory bank 2 | w4 | r4 | w0 | r0 | w1 | r1 | w2 | r2 | w3 | r3 |
| Memory bank 3 | r3 | w4 | r4 | w0 | r0 | w1 | r1 | w2 | r2 | w3 |
| Memory bank 4 | w3 | r3 | w4 | r4 | w0 | r0 | w1 | r1 | w2 | r2 |

1st column, 2nd column, . . . 10th column

1st row, 2nd row, . . . 5th row

T time slots ( T = 10)

Fig. 4

MULTI-CORE DEVICE WITH MULTI-BANK MEMORY

CROSS REFERENCE TO RELATED APPLICATIONS

The present application claims priority to U.S. Patent Application No. 61/559,463, filed on Nov. 14, 2011, and to U.S. Patent Application No. 61/592,847, filed on Jan. 31, 2012, the entire specifications of which are hereby incorporated by reference in their entireties.

TECHNICAL FIELD

Embodiments of the present disclosure relate to multi-bank memories, and more specifically, to accessing a multi-bank memory from multiple processing cores.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Various emerging processing devices, such as network devices, include multiple processing cores that are configured to access a shared memory space. Similarly other emerging processing devices include multiple memory banks that are configured to be accessed by a processing core. However, in various multiple core processing devices, each of the processing cores accesses a single shared memory or its own dedicated memory.

SUMMARY

In various embodiments, the present disclosure provides a multi-core switch device comprising a plurality of P processing cores for processing packets received from a computer network; a memory comprising a plurality of M memory banks, the plurality of processing cores and the plurality of memory banks being arranged such that the plurality of processing cores have access to multiple memory banks among the plurality of memory banks to perform corresponding memory operations; and a memory access controller coupling the plurality of processing cores to the plurality of memory banks, the memory access controller configured to selectively provide, to each of the plurality of processing cores, access to multiple memory banks among the plurality of memory banks over a number of N physical couplings such that N (i) is an integer and (ii) is less than P times M.

In an embodiment, there is also provided a method comprising coupling a plurality of P processing cores to a memory comprising a plurality of M memory banks such that the plurality of processing cores have access to multiple memory banks among the plurality of memory banks to perform corresponding memory operations; and selectively providing, by a memory access controller to each of the plurality of processing cores, access to multiple memory banks among the plurality of memory banks over a number of N physical couplings such that N (i) is an integer and (ii) is less than P times M.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is noted that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

FIG. 4 illustrates an example arbitration schedule for accessing the plurality of memory banks of the system of FIG. 1.

DETAILED DESCRIPTION

Figure 1:
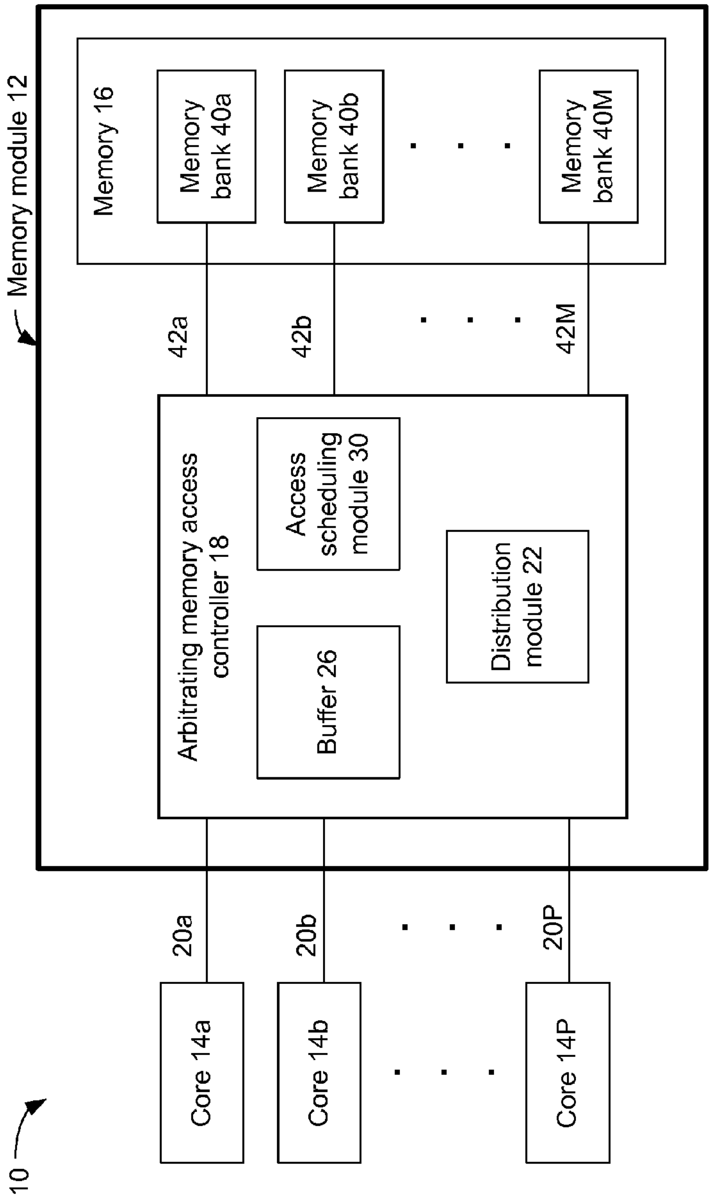
FIG. 1 schematically illustrates a system comprising (i) a plurality of processing cores and (ii) a memory comprising a plurality of memory banks.

FIG. 1 schematically illustrates a system 10 comprising (i) a plurality of processing cores (hereinafter referred to as “cores”) 14*a*, 14*b*, . . . , 14P and (ii) a memory 16 comprising a plurality of memory banks 40*a*, 40*b*, . . . , 40M. Thus, the system 10 comprises P cores and M memory banks, where P and M are appropriate integers. Merely as an example, P is equal to eight and M is equal to twelve, although other appropriate values of P and M may also be possible. The memory banks 40*a*, . . . , 40M may be formed, for example, by partitioning the memory 16 in M sections, each section having its own separate data access channel, in an embodiment. The memory banks 40*a*, . . . , 40M can be accessed simultaneously, e.g., in parallel, for instance using the corresponding separate data access channels. In an embodiment, the system 10 comprises a memory module 12, which includes the memory 16 and an arbitrating memory access controller 18 (henceforth referred to as “controller 18”). In an embodiment, the controller 18 arbitrates access by respective cores to the various memory banks, as will be discussed herein in more detail. The cores 14*a*, . . . , 14P are coupled to the controller 18 through respective signal lines 20*a*, 20*b*, . . . , 20P (e.g., the core 14*a* is coupled to the controller 18 through the signal line 20*a*, the core 14*b* is coupled to the controller 18 through the signal line 20*b*, and so on). The memory banks 40*a*, 40*b*, . . . , 40M are coupled to the controller 18 through respective signal lines 42*a*, 42*b*, . . . , 42M (e.g., the memory bank 40*a* is coupled to the controller 18 through the signal line 42*a*, the memory bank 40*b* is coupled to the controller 18 through the signal line 42*b*, and so on).

In an embodiment, various components of the system 10 are arranged and configured such that the plurality of cores 14*a*, 14*b*, . . . , 14P have access to multiple memory banks among the plurality of memory banks 40*a*, 40*b*, . . . , 40M, to perform corresponding memory operations. For example, in an embodiment, the controller 18 is configured to selectively provide, to each of the plurality of cores 14*a*, . . . , 14P, access to multiple memory banks among the plurality of memory banks 40*a*, . . . , 40M on a time division multiplexing basis. In an embodiment, access to the memory banks is arbitrated among different ones of the memory banks, such that over time any given core is granted access to multiple banks. In an embodiment, at any given time (e.g., at any given clock cycle), the controller 18 is configured to provide, to a core, read access to a memory bank and/or write access to another memory bank among the plurality of memory banks 40*a*, . . . , 40M. Similarly, at any given time (e.g., at any given clock cycle), the controller 18 is configured to provide access to a memory bank from a single core among the plurality of cores 14*a*, . . . , 14P. In an example, during a given clock cycle, each of multiple memory banks (e.g., all or a subset of the memory banks 40*a*, . . . , 40M) may be accessed by a respective memory request from a respective core of multiple cores (e.g., all or a subset of the cores 14*a*, . . . , 14P). For example, during a first clock cycle, (i) a read request from the core 14*b* to read contents from the memory bank 40*a*, (ii) a write request from the core 14*a* to write contents to the memory bank 40*b*, and (iii) a read request from the core 14*a* to read contents from the memory bank 40*c* may be executed (e.g., along with memory requests directed to one or more of the memory banks 40*d*, . . . , 40M). During a second clock cycle that follows the first clock cycle, (i) a write request from the core 14*c* to read contents from the memory bank 40*a*, (ii) a read request from the core 14*a* to read contents from the memory bank 40*b*, and (iii) a write request from the core 14P to read contents from the memory bank 40*c* may be executed (e.g., along with memory requests directed to one or more of the memory banks 40*d*, . . . , 40M). In an example, the controller 18 is configured to selectively provide, to each of the plurality of cores 14*a*, . . . , 14P, access to multiple memory banks among the plurality of memory banks 40*a*, . . . , 40M over a number of N physical couplings. N is an integer and is, for example, less than P times M (i.e., N<P×M). In the embodiment of FIG. 1, N is equal to (P+M). For example, the N physical couplings comprise signal lines 20*a*, . . . , 20P and 42*a*, . . . , 42M.

In contrast, in a straightforward coupling of P processing cores that need to access M memory banks, each of the P processing cores has to be connected to each of the M memory banks, for which P times M (i.e., P×M) physical couplings are needed. Thus, the system 10 of FIG. 1 provides the plurality of cores 14*a*, 14*b*, . . . , 14P access to multiple memory banks among the plurality of memory banks 40*a*, 40*b*, . . . , 40M using substantially fewer physical couplings, e.g., compared to that of the above discussed straight forward system.

In an embodiment, the system 10 (or at least some of the components of the system 10) is included in a multi-core switch device, e.g., a switching device for a computer network in which there are several processing cores, all of which share a common memory space that is divided into separate memory banks, in which the various memory banks are respectively served by plural data transfer channels. In such a multi-core switch device, data packets received over a network are processed at wirespeed. A processing load (e.g., associated with processing the received data packets) are shared among the processing cores, and the processing cores accesses the memory banks for processing the data packets (e.g., for storing the data packets). In an example, the memory access needs of a processing core are not fully randomized (e.g., as the processing is substantially equally shared by the processing cores); there is an inherent built in latency related to a maximum speed at which data packets are received and processed by the processing cores of the multi-core switch device.

In an embodiment, one or more of the plurality of cores 14*a*, 14*b*, . . . , 14P are disposed on a single integrated circuit (e.g., disposed on a system on a chip (SoC)). In an example and although not illustrated in FIG. 1, the system 10 is coupled to a network switch. The network switch is coupled to a network (e.g., the Internet, an intranet, etc.), from which the network switch receives data packets. The network switch transmits the data packets to one or more of the plurality of cores 14*a*, . . . , 14P. The plurality of cores 14*a*, . . . , 14P transmits the received data packets to the memory module 12, for storing in the memory banks 40*a*, . . . , 40M.

The controller 18 receives memory requests (e.g., read requests and/or write requests) from the cores 14*a*, . . . , 14P. In an embodiment, the controller 18 comprises a memory request buffer 26 (henceforth referred to as buffer 26) to buffer memory requests received from the cores 14*a*, . . . , 14P. The controller 18 further comprises an access scheduling module 30 configured to arbitrate time slots for executing the memory requests received from the cores 14*a*, . . . , 14P (e.g., which are buffered in the buffer 26), in an embodiment.

Merely as an example, the controller 18 may receive and buffer (e.g., in the buffer 26) (i) a first memory request, which is a read request from the core 14*a*, to read data from the memory bank 40*b*; (ii) a second memory request, which is a write request from the core 14*c*, to write data to the memory bank 40*b*; and (iii) a third memory request, which is a read request from the core 14P, to read data from the memory bank 40*b*. The access scheduling module 30 may arbitrate time slots for executing the three memory requests to access the memory bank 40*b* by the cores 14*a*, 14*c* and 14P. For example, the access scheduling module 30 may arbitrate a first time slot (e.g., during a first clock cycle) to execute the second memory request, a second time slot (e.g., during a second clock cycle) to execute the first memory request, and a third time slot (e.g., during a third clock cycle) to execute the third memory request.

In an embodiment, the controller 18 also comprises a distribution module 22 configured to distribute each of a plurality of memory requests (e.g., which are received by the controller 18 from the cores 14*a*, . . . , 14P, and buffered in the buffer 26) to a corresponding memory bank of the plurality of memory banks 40*a*, . . . , 40M, based on the access scheduling module 30 arbitrating the time slots for executing the plurality of memory requests. For example, in the above discussed example, the distribution module 22 distributes the second memory request to the memory bank 40*b* during the first clock cycle (e.g., such that the second memory request is executed during the first clock cycle); the first memory request to the memory bank 40*b* during the second clock cycle; and the third memory request to the memory bank 40*b* during the third clock cycle, based on the access scheduling module 30 arbitrating the three time slots for executing the three memory requests.

The distribution module 22 is also configured to (i) receive data from a memory bank, based on an execution of a memory request in the memory bank, and (ii) transmit the received data to an appropriate core (e.g., from which the memory request originated). For example, based on the execution of the above discussed first memory request (e.g., which is a read request from the core 14*a*, to read data from the memory bank 40*b*), the distribution module 22 receives read data from the memory bank 40*b*, and transmits the read data to the core 14*a*. In another example, based on the execution of the above discussed second memory request (e.g., which is a write request from the core 14*c*, to write data to the memory bank 40*b*), the distribution module 22 receives a write acknowledgement from the memory bank 40*b*, and transmits the write acknowledgement to the core 14*c*.

Figure 2:
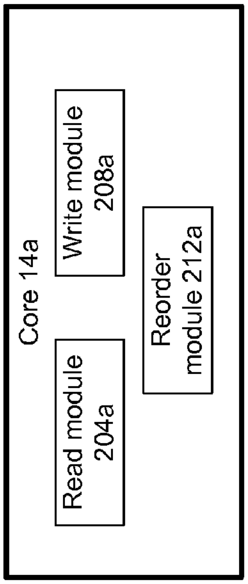
FIG. 2 illustrates an example architecture of an example processing core of the system of FIG. 1.

FIG. 2 illustrates an example architecture of an example core 14*a* of the system 10. The core 14*a* comprises a read module 204*a* configured to transmit (e.g., over the signal line

20*a*) one or more read requests to the memory module 12 (e.g., for reading data from one or more of the memory banks), and receive data (e.g., over the signal line 20*a*) that is read from the one or more of the memory banks. The core 14*a* also comprises a write module 208*a* configured to transmit one or more write requests to the memory module 12 (e.g., for writing data to one or more of the memory banks), and receive write acknowledgement (e.g., over the signal line 20*a*) from the one or more of the memory banks.

In an embodiment, the core 14*a* further comprises a reorder module 212*a*. The core 14*a* transmits a plurality of memory requests to the memory module 12, e.g., transmits a plurality of read requests to the memory module 12 in a given sequence. In response to transmitting plurality of read requests to the memory module 12, the core receives a corresponding plurality of read data from the memory module 12. However, the sequence in which the read requests were transmitted to the memory module 12 may not be same as the sequence in which read data are received by the core 14*a* from the memory module 12. For example, the core 14*a* may transmit a first read request, a second read request, and a third read request to the memory module 12, in that order. However, the access scheduling module 30 may schedule the execution of the first, second and third read requests in a different sequence. For example, the second read request may be executed, followed by execution of the third read request, followed by execution of the first read request. Accordingly, a second read data corresponding to the second read request may be initially received by the core 14 from the memory module 12, followed by a third read data corresponding to the third read request, followed by a first read data corresponding to the first read request. In an embodiment, the reorder module 212*a* reorders the received second, third and first read data, such that these read data are ordered in a sequence in which the corresponding read requests were transmitted by the core 14*a* to the memory module 12. For example, the reorder module 212*a* reorders these received read data as the first read data, second read data and third read data, for further processing by the core 14*a*.

The reorder module 212*a* receives responses to memory requests from the memory module 12. For example, in response to transmitting read requests and write requests to the memory module 12, the reorder module 212*a* respectively receives read data and write acknowledgements from the memory module 12. In an embodiment, the reorder module 212*a* reorders the read data and the write acknowledgements received from the memory module 12 (e.g., based on an order in which the read requests and the write requests were transmitted to the memory module 12). However, in another embodiment, only read data (and not the write acknowledgements) need to be reordered. Accordingly, in such an embodiment, the reorder module 212*a* reorders only the read data received from the memory module 12 (e.g., based on an order in which read requests were transmitted to the memory module 12).

Although FIG. 2 illustrated only the core 14*a* in detail, various other cores of the system 10 may have an architecture that is at least in part similar to the architecture of the core 14*a* of FIG. 2. For example, one or more of the cores 14*b*, . . . , 14P comprises a read module, a write module and/or a reorder module, similar to the core 14*a*.

Figure 3:
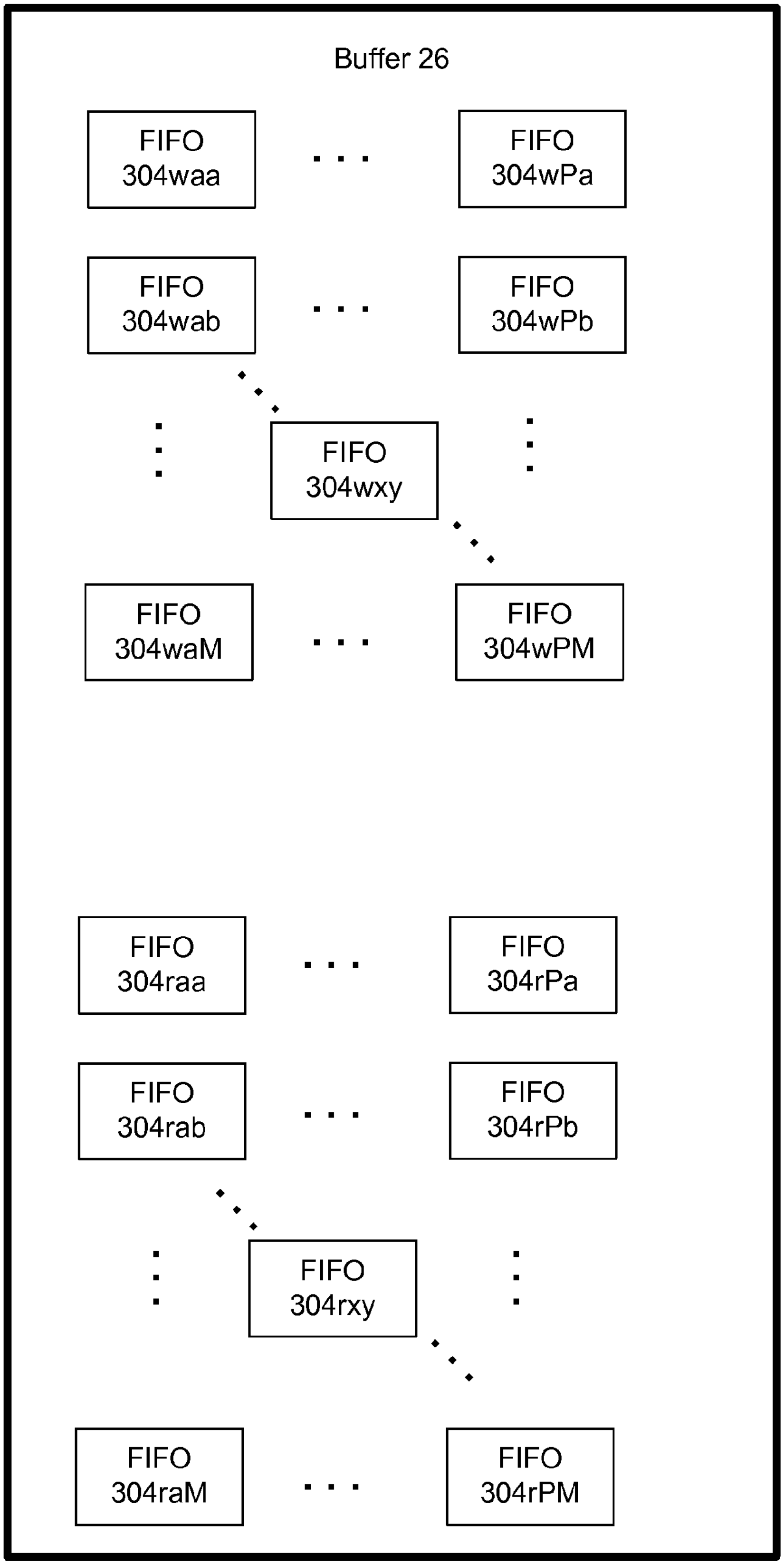
FIG. 3 illustrates a memory request buffer of the system of FIG. 1 in more detail.

FIG. 3 illustrates the buffer 26 of the system 10 of FIG. 1 in more detail. In an embodiment, the buffer 26 comprises a plurality of first-in first-out (FIFO) queues, as illustrated in FIG. 3. For example, the buffer 26 comprises FIFO queues 304*wxy*, where x varies from a, . . . , P, and y varies from a, . . . , M. In general, for a FIFO queue 304*wxy*, the "w" in the label indicates that the FIFO queue is associated with a write request; the "x" in the label indicates that the FIFO queue is associated with a core 14*x* (where x varies from a, . . . , P, corresponding to the cores 14*a*, . . . , 14P, respectively); and the "y" in the label indicates that the FIFO queue is associated with a memory bank 40*y* (where y varies from a, . . . , M, corresponding to the memory banks 40*a*, . . . , 40M, respectively).

The buffer 26 also comprises FIFO queues 304*rxy*, where x varies from a, . . . , P, and y varies from a, . . . , M. In general, for a FIFO queue 304*rxy*, the "r" in the label indicates that the FIFO queue is associated with a read request; the "x" in the label indicates that the FIFO queue is associated with a core 14*x* (where x varies from a, . . . , P, corresponding to the cores 14*a*, . . . , 14P, respectively); and the "y" in the label indicates that the FIFO queue is associated with a memory bank 40*y* (where y varies from a, . . . , M, corresponding to the memory banks 40*a*, . . . , 40M, respectively).

Thus, write requests from a given core and for a given memory bank are buffered in a corresponding FIFO queue in the buffer 26 (e.g., write requests from core x and for memory bank y are buffered in the FIFO queue 304*wxy* of the buffer 26). Similarly, read requests from a given core and for a given memory bank are buffered in a corresponding FIFO queue in the buffer 26 (e.g., read requests from core x and for memory bank y are buffered in the FIFO queue 304*rxy* of the buffer 26). Whenever the controller 18 receives a memory request (e.g., read requests and/or write requests) from the cores 14*a*, . . . , 14P, the controller 18 buffers the memory request in a corresponding FIFO queue of the buffer 26, e.g., for execution at a later time.

As previously discussed, the access scheduling module 30 of the controller 18 is configured to arbitrate time slots for executing the memory requests received from the cores 14*a*, . . . , 14P (e.g., which are buffered in the buffer 26). The time slots can be arbitrated using an appropriate arbitration algorithm. In an embodiment, the time slots are arbitrated such that at any time (e.g., during a clock cycle), a memory bank is accessed by a single core (e.g., a single memory request corresponding to the memory bank is executed during the clock cycle). Similarly, the time slots are also arbitrated such that at any time (e.g., during a clock cycle), a single read request from a specific core (and/or a single write request from the specific core) is executed.

FIG. 4 illustrates an example arbitration schedule for accessing the memory banks 40*a*, . . . , 40M of the system 10 of FIG. 1. FIG. 4 comprises a table 400, which includes the example arbitration schedule for accessing the memory banks 40*a*, . . . , 40M. The example arbitration schedule of FIG. 4 is based on time division multiplexing, although in another embodiment, any other appropriate type of arbitration schedule (e.g., a round robin schedule, a weighted round robin schedule, a random arbitration schedule, or the like) for accessing the memory banks may be used. In an embodiment, the table 400 is received, generated and/or accessed by the access scheduling module 30. For example, the access scheduling module 30 allocates time slots for execution of memory requests based on the table 400.

The example table 400 of FIG. 4 assumes five memory banks (e.g., memory bank 0, . . . , memory bank 4) and five cores (e.g., core 0, . . . , core 4), although such numbers of the memory banks and/or the cores do not limit the teachings of this disclosure. The example table 400 of FIG. 4 illustrates allocation of memory requests for 10 time slots (e.g., 10 clock cycles), although such a number of time slots does not limit the teachings of this disclosure. For example, any other appropriate numbers of the memory banks, cores and/or time slots may also be possible.

Each row of the table 400 is associated with a memory bank of the memory banks 0, . . . , 4. For example, a first row of the table 400 illustrates allocation of time slots (e.g., clock cycles) for execution of memory requests (e.g., read requests and/or write requests) in the memory bank 0; a second row of the table 400 illustrates allocation of time slots for execution of memory requests (e.g., read requests and/or write requests) in the memory bank 1; and so on. Thus, the table 400 has five rows, corresponding to the memory banks 0, . . . , 4, respectively.

Each column of the table 400 illustrates during a corresponding clock cycle, allocation for execution of memory requests (e.g., read requests and/or write requests) in the memory banks 0, . . . , 4. For example, a first column of the table 400 illustrates allocation, during a first clock cycle, for execution of memory requests in the memory banks 0, . . . , 4; a second column of the table 400 illustrates allocation, during a second clock cycle, for execution of memory requests in the memory banks 0, . . . , 4; and so on. Thus, the table 400 has ten columns, corresponding to the clock cycles 0, . . . , 9, respectively.

Each entry (cell) of the table 400 identifies a core and a type of memory request (e.g., a read request or a write request) this is to be executed by a corresponding memory bank during a given time slot. Each entry (cell) of the table 400 starts with either "w" or "r", where "w" refers to allocation of a write request and "r" refers to allocation of a read request. Furthermore, each entry of the table 400 ends with a number that ranges from 0 to 4, where the number refers to a specific core, whose memory request is to be executed by the corresponding memory bank during the corresponding time slot.

For example, an element in the $5^{th}$ row and $2^{nd}$ column of the table 400 is r3, which indicates that during the $2^{nd}$ clock cycle, a read request from the core 3 for the memory bank 4 is slotted to be executed. Thus, a read request from a FIFO queue 304*rde* (e.g., which corresponds to the core 3 and the memory bank 4, as discussed with respect to FIG. 3) of the buffer 26 is slotted to be executed during the $2^{nd}$ clock cycle.

In another example, an element in the $1^{st}$ row and $1^{st}$ column of the table 400 is w0, which indicates that during the $1^{st}$ clock cycle, a write request from the core 0 for the memory bank 0 is slotted to be executed. Thus, a write request from a FIFO queue 304*aa* (e.g., which corresponds to the core 0 and the memory bank 0, as discussed with respect to FIG. 3) of the buffer 26 is slotted to be executed during the $1^{st}$ clock cycle.

As illustrated in FIG. 4, the table 400 allocates clock cycles for execution of memory requests on a time division multiplexing basis. For example, read requests and write requests from each core and for each memory bank are allocated based on time division multiplexing. For example, read requests and write requests from each core and for each memory bank are allocated time slots on a periodic basis, e.g., such that read requests and write requests from each core and for each memory bank are allocated substantially a same number of time slots over a given period of time. Furthermore, as illustrated in FIG. 4, during a given clock cycle, each memory bank can be accessed for execution of a single memory request. As also illustrated in FIG. 4, during a given clock cycle, a single read request from a given core can be executed. For example, at most one read request from, for example, core 4 can be executed during a given clock cycle. Similarly, during a given clock cycle, a single write request from a given core can be executed. For example, at most one write request from, for example, core 4 can be executed during a given clock cycle.

In an embodiment and as illustrated in FIG. 4, during a time window defined by T time slots, an allocation of clock cycles to execute the memory requests is distributed (e.g., equally or evenly distributed) among the processing cores 0, . . . , 4. In the example of FIG. 4, T is equal to 10 clock cycles (i.e., T corresponds to the entire table 400). As illustrated in FIG. 4, during the clock cycles 0, . . . , 9, each core is allocated 5 clock cycles for read requests (e.g., where each of the read requests in the allocated 5 clock cycles are for accessing a respective memory bank of the 5 memory banks) and 5 clock cycles for write requests (e.g., where each of the write requests in the allocated 5 clock cycles are for accessing a respective memory bank of the 5 memory banks).

The table 400 forms a predictable, predetermined map for allocating clock cycles for execution of read requests and write requests from various cores and for various memory banks. In an embodiment, the table 400 may be dynamically updated, e.g., by the access scheduling module 30. For example, in response to the access scheduling module 30 detecting that memory requests from a first core is not being received by the controller 18 (e.g., by detecting that the associated FIFO queue at the buffer 26 is empty, e.g., due to a fault at the first core, the first core entering a sleep mode, and/or for any other reason), the access scheduling module 30 can dynamically update the table 400 such that memory requests from the first core are allocated relatively less clock cycles (or no clock cycles at all). In another example, in response to the access scheduling module 30 detecting a large number of memory requests being received by the controller 18 from a second core (e.g., by detecting that the associated FIFO queue at the buffer 26 is almost full), the access scheduling module 30 can dynamically update the table 400 such that memory requests from the second core are allocated relatively more clock cycles.

It may be possible that in spite of allocating a clock cycle for execution of, for example, a read request from core 3 and for memory bank 4, no such read request is available for execution in the corresponding FIFO queue (e.g., the corresponding FIFO queue is empty). In such an example, the clock cycle may be wasted (e.g., as no execution of read request takes place for the memory bank 4 during the clock cycle). However, in an embodiment and although not illustrated in FIG. 1, the system 10 includes a mechanism to substantially equally distribute data packets (e.g., received over a network, e.g., the Internet) to the cores 14*a*, . . . , 14P, e.g., such that the cores 14*a*, . . . , 14P are almost evenly issuing memory requests to the memory module 12. Accordingly, probability of a large number of clock cycles being wasted is not very high for the system 10.

In an embodiment, using the system 10 to allocate memory resource to various cores has several advantages. For example, as previously discussed, the system 10 selectively provides, to each of the plurality of cores 14*a*, . . . , 14P, access to multiple memory banks among the plurality of memory banks 40*a*, . . . , 40M over a number of N physical couplings, where N is an integer and is equal to (P+M). For example, the N physical couplings comprise signal lines 20*a*, . . . , 20P and 42*a*, . . . , 42M. In contrast, in a conventional system in which each of P processing cores has to have access to M memory banks, each of the P processing cores has to be connected to each of the M memory banks, for which P times M (i.e., P×M) physical couplings are needed. Thus, the system 10 of FIG. 1 provides the plurality of cores 14*a*, 14*b*, . . . , 14P access to multiple memory banks among the plurality of memory banks 40*a*, 40*b*, . . . , 40M using a substantially less number of physical couplings, e.g., compared to that of the above discussed conventional system.

Furthermore, the system 10 is easily scalable. For example, if it is intended that an additional core access the memory banks 40*a*, . . . , 40M, the additional core needs to be coupled to the controller 18 (that is, a single additional signal line is needed). Also, the table 400 needs to be updated to allocate clock cycles for executing memory requests from the additional core. However, by comparison, in a system in which each core is connected to each memory bank, adding an additional core requires connecting the additional core to each of the memory banks, thereby requiring a large number of new wirings (e.g., which is equal to a number of the memory banks) in such a system. Thus, the system 10 provides easier scalability while adding new cores (as well as new memory banks), e.g., compared to that in the above discussed conventional system.

Figure 5:
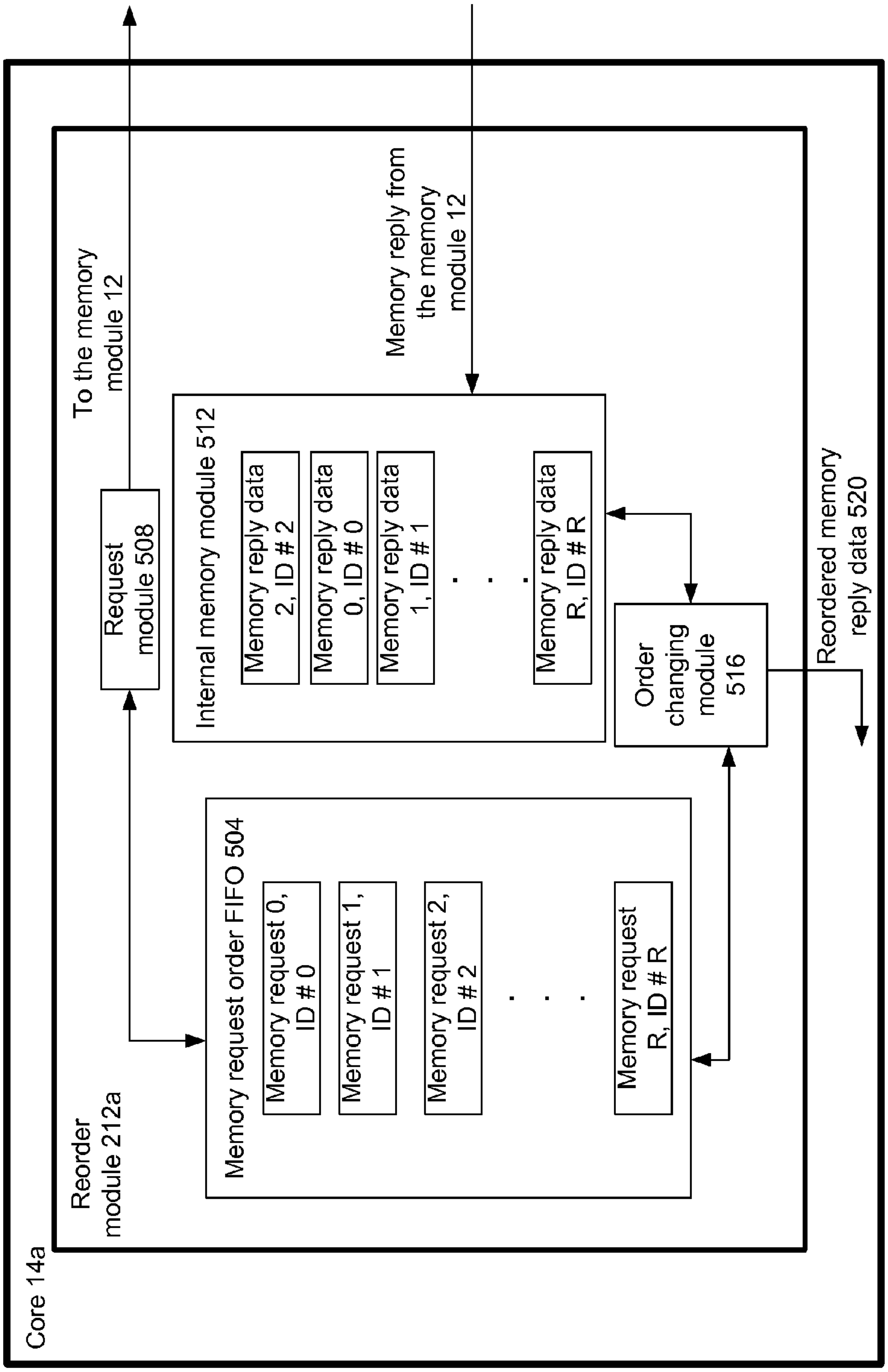
FIG. 5 illustrates a reorder module in the example processing core of FIG. 2.

FIG. 5 illustrates the reorder module 212*a* in the core 14*a* of FIG. 2 in more detail. As previously discussed, the reorder module 212*a* reorders data received from the memory module 12, based on an order in which memory requests are transmitted by the core 14*a* to the memory module 12.

In an embodiment, the reorder module 212*a* comprises a memory request order FIFO queue 504 (henceforth referred to "FIFO 504"), which is configured to store an order in which memory requests are transmitted from the core 14*a* to the memory module 12. For example, the reorder module 212*a* receives memory requests from other components of the core 14*a* (e.g., from the read module 204*a* and/or the write module 208*a* of the core 14*a*, see FIG. 2), for transmission to the memory module 12. The FIFO 504 stores the memory requests (e.g., memory requests 0, . . . , R, as illustrated in FIG. 5) in the order in which the memory requests are to be sent to the memory module 12 (e.g., which corresponds to the order in which the memory requests are received by the reorder module 212*a*). In an embodiment, each memory request has a corresponding unique identification number (e.g., illustrated as ID 0, . . . , ID R in FIG. 5). The FIFO 504 also stores the unique identification numbers of the memory requests. In an example, the unique identification number of a memory request may be a serial number of the memory request. However, the unique identification number of a memory request may be any unique number associated with the memory request, and not necessarily the serial number of the memory request.

In the embodiment illustrated in FIG. 5, the reorder module 212*a* reorders replies received for both read requests and write requests. Accordingly, both read and write requests are assigned corresponding unique identification numbers. However, in another embodiment, the reorder module 212*a* reorders replies received for only read requests (but does not reorder replies received for write requests). Accordingly, in such an embodiment, write memory requests may not be assigned any unique identification number (or write memory requests may be assigned unique identification number, but the FIFO 504 may not keep track of the unique identification numbers for the write requests).

The reorder module 212*a* comprises a request module 508 configured to transmit the memory requests to the memory module 12 from the FIFO 504. In an embodiment, the request module 508 transmits the memory requests in the order in which the memory requests are stored in the FIFO 504. In an embodiment, along with a memory request (or embedded within the memory request), the request module 508 also transmits the corresponding unique identification number of the memory request to the memory module 12.

Once the memory module 12 receives the memory requests from the request module 508, the memory module 12 executes the received memory requests, e.g., based on the arbitration schedule of the table 400 of FIG. 4. However, as previously discussed, the order in which the memory requests are executed in the memory module 12 may not be same as the order in which the memory requests were transmitted by the request module 508 to the memory module 12.

The reorder module 212*a* further comprises an internal memory module 512 configured to receive and store data from the memory module 12, in response to the memory module 12 executing the memory requests from the core 14*a*. For example, in response to the memory module 12 executing a read request from the core 14*a*, the memory module 12 transmits (i) corresponding read data and (ii) the associated unique identification number of the read request to the internal memory module 512. In another example, in response to the memory module 12 executing a write request from the core 14*a*, the memory module 12 transmits (i) a corresponding write acknowledgement and (ii) the associated unique identification number of the write request to the internal memory module 512.

Data received by the internal memory module 512 from the memory module 12, in response to execution of a memory request by the memory module 12, is referred to as memory reply data. For example, for a read request transmitted to the memory module 12, the memory reply data comprises (i) the read data and (ii) the associated unique identification number of the read request, which are received by the internal memory module 512 from the memory module 12. In another example, for a write request transmitted to the memory module 12, the memory reply data comprises (i) the write acknowledgement and (ii) the associated unique identification number of the write request, which are received by the internal memory module 512 from the memory module 12.

As previously discussed, an order in which the memory requests are executed in the memory module 12 may not be same as the order in which the memory requests were transmitted by the request module 508 to the memory module 12. In an embodiment, the reorder module 212*a* comprises an order changing module 516 for reordering the memory reply data (and outputting reordered memory reply data 520) in the order in which memory requests were transmitted to the memory module 12.

For example, the order changing module 516 monitors memory reply data, along with the identification numbers of the associated memory request, in the internal memory module 512. The order changing module 516 is also aware of the order in which the memory requests were transmitted, e.g., based on information received from the FIFO 504. Based on (i) the identification numbers of the associated memory request in the memory reply data stored in the internal memory module 512 and (ii) the order in which the memory requests were transmitted, the order changing module 516 reorders the memory reply data and outputs the reordered memory reply data 520.

For example, as illustrated in FIG. 5, the memory requests 0, 1, 2, . . . , R are assumed to be transmitted to the memory module 12 in that order, along with the associated unique identification numbers 0, 1, 2, . . . , R, respectively. In response to executing the memory requests 0, 1, 2, . . . , R, memory reply data 0, 1, 2, . . . , R are generated and transmitted to the internal memory module 512, along with the associated unique identification numbers 0, 1, 2, . . . , R, respectively. However, in an example, the memory requests 0, 1, 2, . . . , R are executed in a different order, such that memory reply data 2 is received first (along with the associated identification number 2), followed by memory reply data 0 (along with the associated identification number 0), followed by memory reply data 1 (along with the associated identification number 1), and so on, as illustrated in FIG. 5. The order changing module 516 monitors the internal memory module 512. As soon as memory reply data 0 is received in the internal memory module 512, the order changing module 516 outputs the memory reply data 0 (possibly along with the associated identification number 0) as a part of the reordered memory reply data 520. Subsequently, after the memory reply data 1 is received in the internal memory module 512, the order changing module 516 outputs the memory reply data 1 (possibly along with the associated identification number 1) as a part of the reordered memory reply data 520. While the memory reply data 1 is output by the order changing module 516, the memory reply data 2 is already available in the internal memory module 512 (as the memory reply data 2 was received prior to receiving the memory reply data 0 and 1). Accordingly, immediately after outputting the memory reply data 1, the order changing module 516 outputs the memory reply data 2 (possibly along with the associated identification number 2) as a part of the reordered memory reply data 520. This process continues, as the order changing module 516 continues outputting appropriate memory reply data as and when these are available.

In the embodiment illustrated in FIG. 5 and as discussed above, the reorder module 212*a* reorders memory reply data for both read requests and write requests. However, in another embodiment, only read data (and not the write acknowledgements) need to be reordered (such that the read data can be processed in a specific order by the processing core, e.g., in the order in which the read requests were transmitted). In such an embodiment, the reorder module 212*a* reorders memory reply data received for only read requests (but does not reorder memory reply data received for write requests). Accordingly, in such an embodiment, write memory requests may not be assigned any unique identification number (or write memory requests may be assigned unique identification number, but the FIFO 504 may not keep track of the unique identification numbers for the write requests). Additionally or alternatively, in such an embodiment, memory reply data (i.e., the write acknowledgements) corresponding to the write requests may not be reordered by the order changing module 516.

Figure 6:
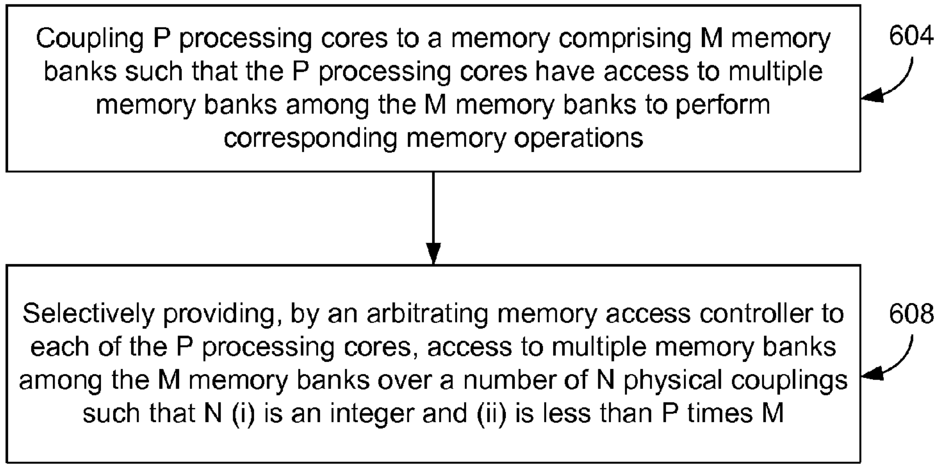
FIG. 6 illustrates an example method for operating the system of FIG. 1.

FIG. 6 illustrates an example method 600 for operating the system 10 of FIG. 1. At 604, P processing cores (e.g., cores 14*a*, . . . , 14P) are coupled to a memory (e.g., memory 16) comprising M memory banks (e.g., memory banks 40*a*, . . . , 40M) such that the P processing cores have access to multiple memory banks among the M memory banks to perform corresponding memory operations. At 608, an arbitrating memory access controller (e.g., controller 18) selectively provides to each of the P processing cores, access to multiple memory banks among the M memory banks over a number of N physical couplings (e.g., physical couplings 20*a*, . . . , 20P and 42*a*, . . . , 42M) such that N (i) is an integer and (ii) is less than P times M.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A multi-core switch device comprising:

a plurality of P processing cores for processing packets received from a computer network;

a memory comprising a plurality of M memory banks, the plurality of processing cores and the plurality of memory banks being arranged such that the plurality of processing cores have access to multiple memory banks among the plurality of memory banks to perform corresponding memory operations; and a memory access controller coupling the plurality of processing cores to the plurality of memory banks, the memory access controller configured to selectively provide, to ones of the plurality of processing cores, access to the multiple memory banks among the plurality of memory banks over a number of N physical couplings such that N (i) is an integer and (ii) is less than P times M, the memory access controller comprising a memory request buffer module including a plurality of queues, ones of the plurality of queues being configured to queue memory requests that are (i) from a corresponding predetermined processing core among the plurality of processing cores and (ii) intended for a corresponding predetermined memory bank among the plurality of memory banks, ones of a first subset of the plurality of queues being configured to exclusively queue read memory requests, and ones of a second subset of the plurality of queues being configured to exclusively queue write memory requests.

2. The multi-core switch device of claim 1, wherein:

the memory access controller is coupled to each of the plurality of M memory banks using a corresponding physical coupling such that the memory access controller is coupled to the plurality of M memory banks using M physical couplings;

each of the plurality of P processing cores is coupled to the memory access controller using a corresponding physical coupling, such that the plurality of P processing cores is coupled to the memory access controller using P physical couplings; and N is equal to (P+M).

3. The multi-core switch device of claim 1, wherein the memory access controller is configured to selectively provide, to each of the plurality of processing cores, access to selected ones of the multiple memory banks on a time division multiplexing basis.

4. The multi-core switch device of claim 1, wherein the memory access controller is further configured to:

receive from the plurality of processing cores a plurality of simultaneous memory requests to perform a corresponding plurality of memory operations, such that each of the plurality of simultaneous memory requests is received from a corresponding processing core of the plurality of processing cores;

queue the plurality of simultaneous memory requests; and arbitrate time slots for executing the plurality of simultaneous memory requests such that during a first time slot, a first memory bank of the plurality of memory banks is allocated to perform a single memory request from a first processing core of the plurality of processing cores.

5. The multi-core switch device of claim 4, wherein the memory access controller is further configured to:

arbitrate time slots for executing the plurality of simultaneous memory requests such that during a second time slot that is subsequent to the first time slot, the first memory bank of the plurality of memory banks is allocated to perform another single memory request from a second processing core of the plurality of processing cores, wherein the single memory request is one of a read request and a write request, and the another single memory request is another of the read request and the write request.

6. The multi-core switch device of claim 4, wherein the memory access controller further comprises:

an access scheduling module configured to arbitrate the time slots for executing the plurality of simultaneous memory requests; and a distribution module configured to distribute each of the plurality of simultaneous memory requests to a corresponding memory bank of the plurality of memory banks, based on the access scheduling module arbitrating the time slots for executing the plurality of simultaneous memory requests.

7. The multi-core switch device of claim 4, wherein the memory access controller is further configured to:

arbitrate time slots for executing the plurality of simultaneous memory requests such that during a time window defined by T time slots, an allocation of time slots to execute the plurality of simultaneous memory requests is substantially equally distributed among the plurality of processing cores.

8. The multi-core switch device of claim 1, wherein ones of the plurality of queues is configured to queue a predetermined one of read memory requests or write memory requests, which are received from the corresponding predetermined processing core of the plurality of processing cores, and which are intended to be performed by the corresponding predetermined memory bank of the plurality of memory banks.

9. The multi-core switch device of claim 1, further comprising:

a reorder module associated with a first processing core of the plurality of processing cores, wherein the first processing core transmits, in a first sequence, a plurality of memory requests to the memory access controller for execution by one or more of the plurality of memory banks, wherein the plurality of memory requests are executed in a second sequence, wherein a plurality of memory reply data is generated by correspondingly executing the plurality of memory requests, such that each of the plurality of memory reply data is generated by executing a corresponding memory request of the plurality of memory requests, wherein the plurality of memory reply data is received by the reorder module in the second sequence, and wherein the reorder module is configured to reorder the plurality of memory reply data from the second sequence to the first sequence.

10. The multi-core switch device of claim 1, wherein each of the plurality of processing cores are disposed on a single integrated circuit.

11. The multi-core switch device of claim 1, wherein:

the multi-core switch device is disposed on a network switch;

the network switch is (i) coupled to the computer network and (ii) configured to receive data packets from the computer network; and each of the plurality of processing cores is configured to (i) receive data packets from the network switch and (ii) store data packets in the memory.

12. The multi-core switch device of claim 1, wherein ones of the plurality of queues comprises a corresponding first in first out (FIFO) queue of a plurality of FIFO queues.

13. The multi-core switch device of claim 1, wherein the plurality of queues comprises:

a first queue configured to queue memory requests that are (i) from a first processing core, (ii) intended for a first memory bank, and (iii) exclusively read memory requests; and a second queue configured to queue memory requests that are (i) from the first processing core, (ii) intended for the first memory bank, and (iii) exclusively write memory requests.

14. A method comprising:

coupling a plurality of P processing cores to a memory comprising a plurality of M memory banks such that the plurality of processing cores have access to multiple memory banks among the plurality of memory banks to perform corresponding memory operations; and selectively providing, by a memory access controller to ones of the plurality of processing cores, access to the multiple memory banks among the plurality of memory banks over a number of N physical couplings such that N (i) is an integer and (ii) is less than P times M, the memory access controller comprising a memory request buffer module including a plurality of queues, wherein selectively providing, by the memory access controller to each of the plurality of processing cores, access to the multiple memory banks comprises:

queuing, by ones of the plurality of queues, memory requests that are (i) from a corresponding predetermined processing core among the plurality of processing cores, and (ii) intended for a corresponding predetermined memory bank among the plurality of memory banks, queuing, by ones of a first subset of the plurality of queues, exclusively read memory requests, and queuing, by ones of a second subset of the plurality of queues, exclusively write memory requests.

15. The method of claim 14, wherein coupling the plurality of P processing cores to the memory comprising the plurality of M memory banks further comprises:

coupling the memory access controller to each of the plurality of M memory banks using a corresponding physical coupling, such that the memory access controller is coupled to the plurality of M memory banks using M physical couplings; and coupling each of the plurality of P processing cores to the memory access controller using a corresponding physical coupling, such that (i) the plurality of P processing cores is coupled to the memory access controller using P physical couplings, and (ii) N is equal to (P+M).

16. The method of claim 14, wherein selectively providing, to each of the plurality of processing cores, access to multiple memory banks among the plurality of memory banks further comprises:

selectively providing, to each of the plurality of processing cores, access to multiple memory banks among the plurality of memory banks on a time division multiplexing basis.

17. The method of claim 14, further comprising:

receiving from the plurality of processing cores a plurality of simultaneous memory requests to perform a corresponding plurality of memory operations, such that each of the plurality of simultaneous memory requests is received from a corresponding processing core of the plurality of processing cores;

queuing the plurality of simultaneous memory requests; and arbitrating time slots for executing the plurality of simultaneous memory requests such that during a first time slot, a first memory bank of the plurality of memory banks is allocated to perform a single memory request from a first processing core of the plurality of processing cores.

18. The method of claim 17, wherein arbitrating time slots for executing the plurality of simultaneous memory requests further comprises:

arbitrating time slots for executing the plurality of simultaneous memory requests such that during a second time slot that is subsequent to the first time slot, the first memory bank of the plurality of memory banks is allocated to perform another single memory request from a second processing core of the plurality of processing cores, wherein the single memory request is one of a read request and a write request, and wherein the another single memory request is another of the read request and the write request.

19. The method of claim 17, wherein arbitrating time slots for executing the plurality of simultaneous memory requests further comprises:

arbitrating time slots for executing the plurality of simultaneous memory requests such that during a time window defined by T time slots, an allocation of time slots to execute the plurality of simultaneous memory requests is substantially equally distributed among the plurality of processing cores.

20. The method of claim 14, wherein queuing, by ones of the plurality of queues, the memory requests further comprises:

queuing, by ones of the plurality of queues, memory requests that are a predetermined one of read memory requests or write memory requests.

21. The method of claim 14, further comprising:

transmitting, by a first processing core of the plurality of processing cores, a plurality of memory requests in a first sequence to the memory access controller for execution by one or more of the plurality of memory banks;

in response to transmitting the plurality of memory requests in the first sequence to the memory access controller, receiving a plurality of memory reply data in a second sequence that is different from the first sequence, wherein each of the plurality of memory reply data is generated by executing a corresponding memory request of the plurality of memory requests; and reordering the plurality of memory reply data from the second sequence to the first sequence.

22. The method of claim 14, further comprising:

receiving, by a network switch coupled to a computer network, a plurality of data packets from the computer network;

receiving, by each of the plurality of processing cores, a corresponding one or more of the plurality of data packets; and storing, by each of the plurality of processing cores, the corresponding one or more of the plurality of data packets to a corresponding one or more memory banks of the plurality of memory banks.

* * * * *